United States Patent [19]

Meltsch et al.

[11] Patent Number: 5,574,259
[45] Date of Patent: Nov. 12, 1996

[54] CABLE SLEEVE COMPOSED OF A LONGITUDINALLY DIVIDED HOUSING

[75] Inventors: Hans-Juergen Meltsch, Schwerte; Franz Froelich, Hagen; Rainer Zimmer, Schalksmuehle, all of Germany

[73] Assignee: RXS Schrumpftechnik-Garnituren GmbH, Hagen, Germany

[21] Appl. No.: 360,627

[22] Filed: Dec. 21, 1994

[30] Foreign Application Priority Data

Dec. 22, 1993 [DE] Germany .......................... 43 43 941.1

[51] Int. Cl.⁶ ................................................. H02G 15/113
[52] U.S. Cl. ............................ 174/91; 174/92; 174/93
[58] Field of Search ........................... 174/92, 93, 91, 174/88 R, 77 R

[56] References Cited

U.S. PATENT DOCUMENTS

| | | | |
|---|---|---|---|
| 4,117,259 | 9/1978 | Giebel et al. | 174/92 |
| 4,563,053 | 1/1986 | Pavel | 339/242 X |
| 4,767,652 | 8/1988 | Willie et al. | 428/36 X |
| 4,795,857 | 1/1989 | McInnis | 174/138 F X |
| 4,808,772 | 2/1989 | Pichler et al. | 174/92 |
| 4,822,132 | 4/1989 | Oestreich | 350/96.23 X |
| 4,839,472 | 6/1989 | Pichler | 174/92 |
| 5,313,018 | 5/1994 | Meltsch et al. | 174/92 |
| 5,382,756 | 1/1995 | Dagan | 174/92 |

FOREIGN PATENT DOCUMENTS

| | | | |
|---|---|---|---|
| 0248181 | 12/1987 | European Pat. Off. | |
| 0543350 | 5/1993 | European Pat. Off. | 174/92 |
| 2648630 | 12/1990 | France | |
| 941734 | 7/1956 | Germany | |
| 2515939 | 10/1976 | Germany | 174/92 |
| 1060255 | 3/1967 | United Kingdom | |

*Primary Examiner*—Peter S. Wong
*Assistant Examiner*—Chau N. Nguyen
*Attorney, Agent, or Firm*—Hill, Steadman & Simpson

[57] ABSTRACT

A cable sleeve having a longitudinally divided housing that includes a parting plane and a cable introduction plane for cable introduction openings. Embodiments of the cable sleeve include devices such as a mounting plate, a centerable cable interceptor device and receptacles for seal elements, arranged on the cable sleeve. Closure beads are arranged around and along the parting plane of the housing. The closure beads are held by at least one U-shaped closing rail but preferably by two U-shaped closing rails. A plurality of longitudinal beads are wedge-shaped and undercut, whereas a plurality of end face closure beads are trapezoid-shaped.

12 Claims, 12 Drawing Sheets

CABLE SLEEVE COMPOSED OF A LONGITUDINALLY DIVIDED HOUSING

BACKGROUND OF THE INVENTION

The present invention is directed to a cable sleeve of the type having a housing which is longitudinally divided along a separating plane and having cable introductions at the face ends, whereby the cable introductions are arranged in an introduction plane that is independent of the separating plane of the housing, so that each end face of the cable sleeve is made of the walls of the cable sleeve shells and of a middle piece.

European Patent Application 0 543 350 discloses such a cable sleeve that is composed of longitudinally divided cable sleeve shells. The cable introductions are introduced in a separate introduction plane that is independent of the parting plane of the housing, so that the cable introduction regions and, thus, the cable introduction seals remain unaffected when the cable sleeve is reopened. The cable sleeve, however, is provided with closure elements only along the long sides, so that the sleeve shells must be constructed with corresponding stability so that they do not gape at the end faces. Further, the interior of the cable sleeve does not include any modified devices for a surveyable arrangement of the devices to be protected, requiring additional component parts and assembly work.

SUMMARY OF THE INVENTION

The present invention provides a cable sleeve wherein all of the required individual parts are already largely present in the interior, whereby, additionally, the closure conditions in the parting plane at the end faces of the cable sleeve are to be improved. To this end, a cable sleeve of the type initially described has, in accordance with the invention, at least one mounting plate mounted in the inside of the cable sleeve shells. Centerable cable interception devices are arranged at the cable introduction openings. Receptacles for seal elements are arranged at the cable introduction openings. At least one U-shaped closing rail is arranged at closure beads of an end face and of the long sides along the separating plane of the housing, whereby all legs of the closing rail include a channel matched to the bead shape. The long legs, as well as the closure beads at the long sides of the cable sleeve, are additionally expanded in a wedge shape.

It is an advantage of the present invention to provide a cable sleeve having all the required devices that are needed upon production of a cable splice with respect to the internal structure, the seals with centering cable introductions and the possibility for various sealing methods.

It is also an advantage to provide that the end face parting planes are additionally secured with a stiffening intermediate closure part so that, for example, arcings and, thus, the risk of untightness are precluded. This modification of the cable sleeve is, thus, a unit that is easy for an assembler to manipulate, whereby a great selection of possibilities with respect to the type of assembly is provided at the assembly location.

Additional features and advantages of the present invention are described and will be apparent from the detailed description of the presently preferred embodiments and from the drawings.

DESCRIPTION OF THE PREFERRED EMBODIMENTS

Figure 1:
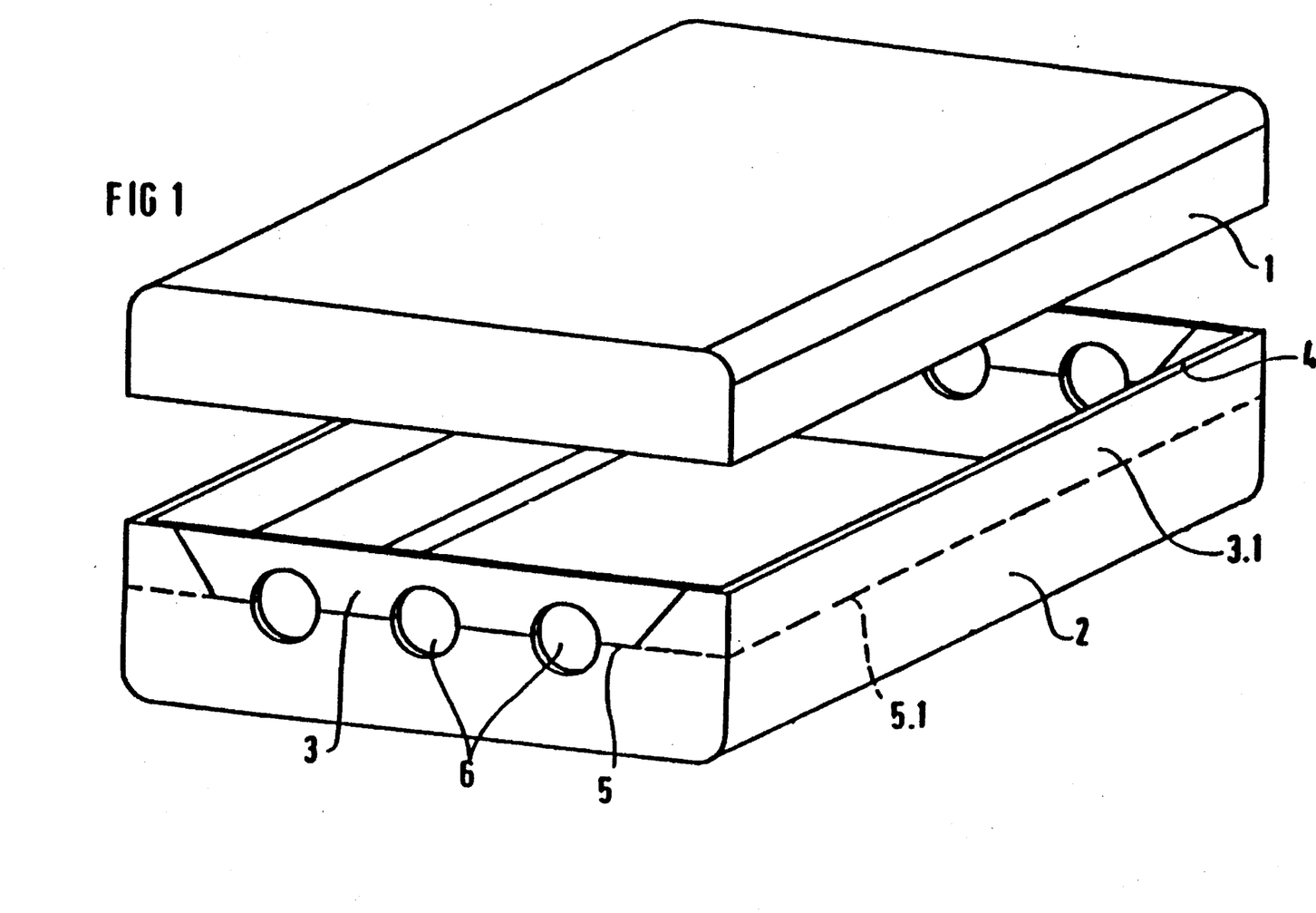
FIG. 1 illustrates a diagram showing a general model of a cable sleeve of the invention.

FIG. 1 illustrates the principle of the cable sleeve of the invention, this being composed of an upper sleeve shell 1, a middle part 3 and a lower sleeve shell 2. The middle part 3 is put in place onto the lower sleeve shell 2 after the insertion of the cables into the introduction openings 6, so that these two parts, together with the introduced cables, form a unit. Subsequently or simultaneous therewith, further assembly work with respect to the cable centering, cable interceptions and cable seals is carried out. The upper sleeve shell 1 can now be put in place or removed independently of this completely assembled unit, whereby the cable introductions between the lower sleeve shell 2 and the middle part 3 remain unaffected as a result. The middle part, for example, can thereby be formed only by end face inserts 3, or may run totally the circumference of the lower sleeve shell 2, as shown in dashed lines for an alternative middle part 3.1. The actual separating plane 4 of the housing, in which an all-around elastic or plastic seal or combinations thereof is introduced, is thereby independent of the cable introduction plane 5 or 5.1. A plastic sealant is preferably inserted in the cable introduction plane 5, at least in the region of the cable introduction openings 6, since a certain sealing in the cable introduction region can, thus, be simultaneously achieved.

Figure 2:
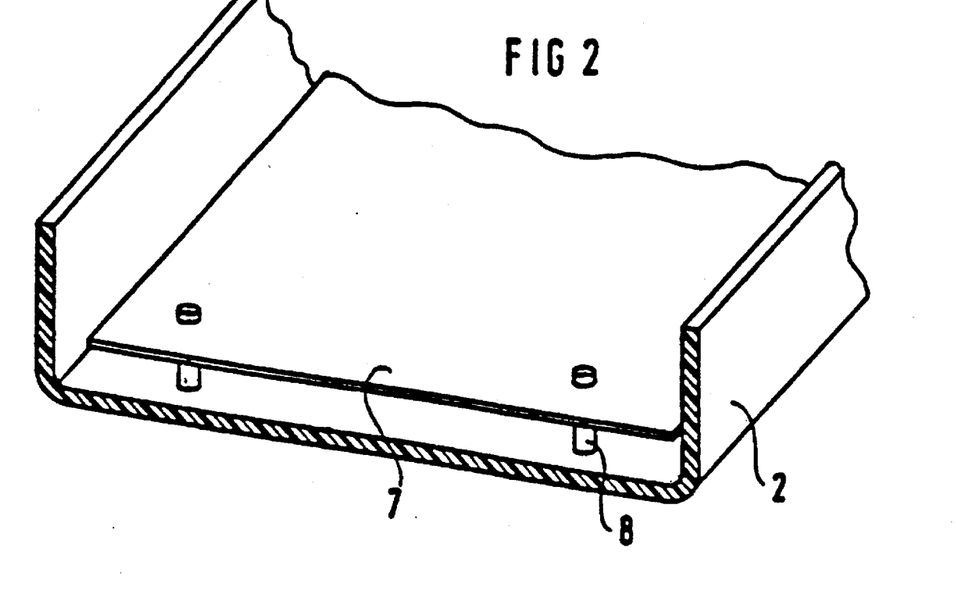
FIG. 2 illustrates the introduction of a mounting plate.

FIG. 2 illustrates a mounting plate 7 on spacer pins 8 inserted within the sleeve shell 2. This, however, is not restricted to only simple mounting plates; correspondingly fashioned or specifically modified inserts can also be introduced as needed. It is likewise possible that a plurality of mounting plates may be arranged following one another or above one another. In any case, the assembly jobs are, thus, facilitated since assembly outside of the sleeve shells 1 and 2, for example, can thereby also be undertaken. After the end of the work, the completely assembled unit is then secured in the sleeve shell 2.

Figure 3:
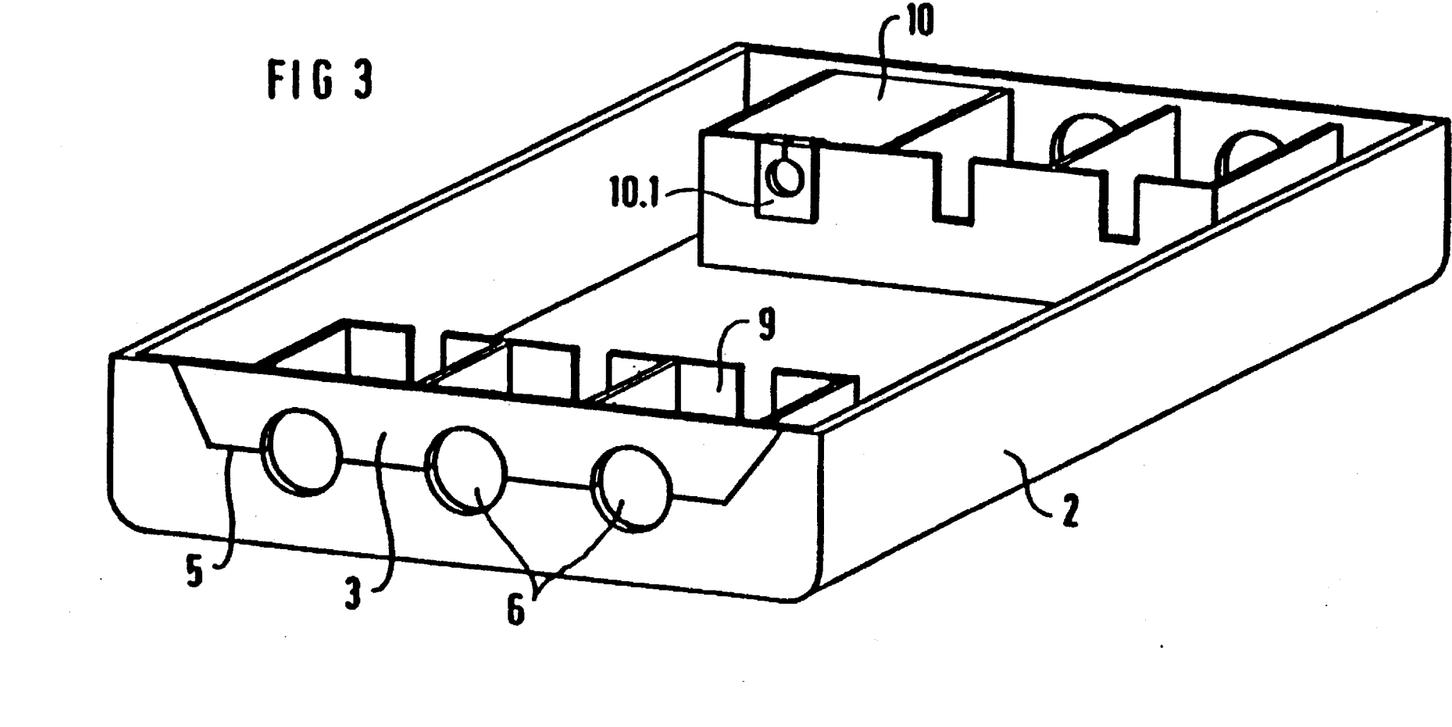
FIG. 3 illustrates the arrangement of seal chambers for castable cable introductions.

FIG. 3 illustrates an example of the employment of the receptacles 9 for the seal elements 10 in the region of the cable introduction openings 6, whereby the fashioning of the sleeve shells 2 already set forth with an additional cable introduction plane is thereby obtained. A receptacle 9 in the form of a cast chamber for receiving the sealant is arranged behind each cable introduction opening 6, whereby all of these receptacles 9 comprise execution slots at the inwardly directed side into which sealing plugs 10.1 can be inserted. These chambers, for example, are injection molded as part of the sleeve shells 1 and 2 or are introduced at the sleeve ends as finished parts. Castable and curable sealants, for example conventional two-component casting resins, are then preferably cast into these chambers.

Figure 4:
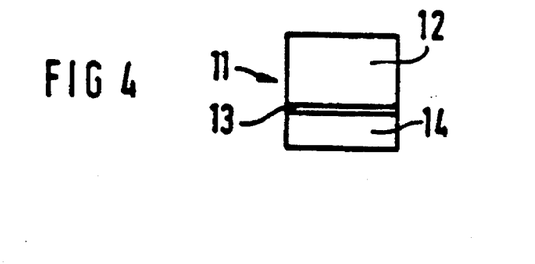
FIG. 4 illustrates a sealing insert.

FIG. 4 illustrates a combined sealing insert 11 for sealing the separating plane of the housing. It is composed of a layer 12, made of elastic material, for example silicon or EPDM; an intermediate carrier layer 13, of metal or plastic; and a layer 14 of plastic material, for example permanent plastic sealant, such as butyl rubber.

Figure 5:
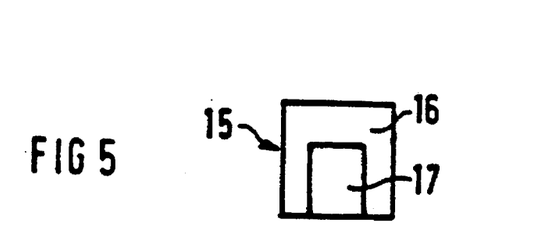
FIG. 5 illustrates a further sealing insert.

FIG. 5 illustrates a combined sealing insert 15 of combined material composed of a layer 16 of elastic material and a layer 17 of plastic material. Additionally, a special structure is selected in this example, so the elastic layer 16 is constructed in a U-shape and is filled with elastic material 17 between the two legs of the U. This has the advantage that the plastic material cannot flow freely to the outside.

FIGS. 6–10 illustrate embodiments of cable introduction structures for the lower sleeve shell 2 that are in the cable introduction plane 5 (see FIG. 1). These cable introductions are generally formed as cable introduction muffs, whereby various sealing possibilities have been shown.

Figure 6:
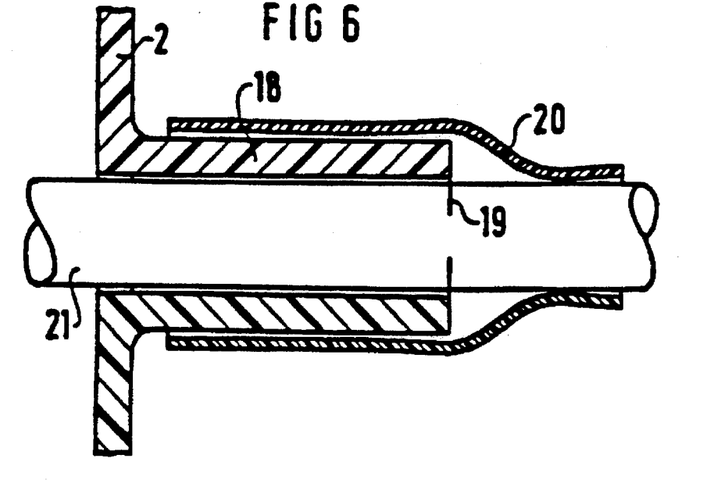
FIG. 6 illustrates a cable introduction having a shrink hose.

FIG. 6 illustrates that the cable introduction muff 18 is sealed relative to the introduced cable 21 by a shrink hose 20. In addition, a centering device in the form of a lamella-like all-around lip 19 is indicated here. Upon introduction of a cable, the centering device is centrally aligned due to the elasticity of the lip 19.

Figure 7:
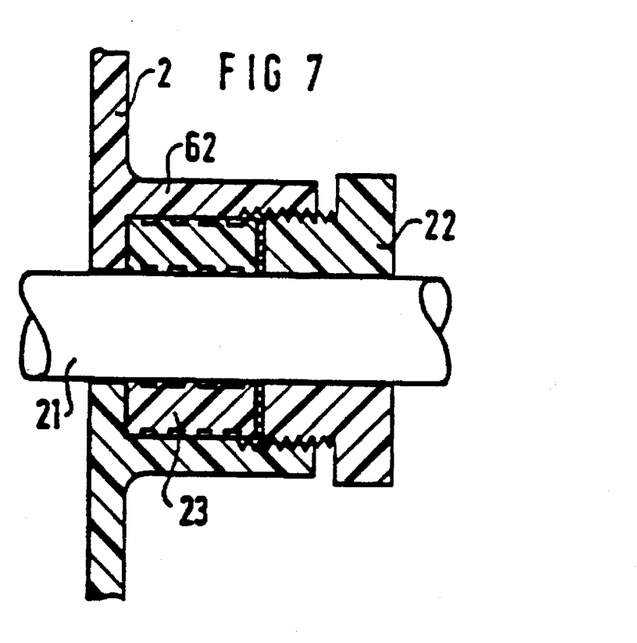
FIG. 7 illustrates a cable introduction with a stuffing box.

FIG. 7 illustrates a sealing in the cable introduction muff 62 by way of a stuffing box seal. The interspace between the cable 21 and the inside wall of the cable introduction muff 62 is occupied with a sealing plug 23 of plastic or elastic material. The sealing compression of the material with the assistance of an annular screw 22 subsequently occurs.

Figure 8:
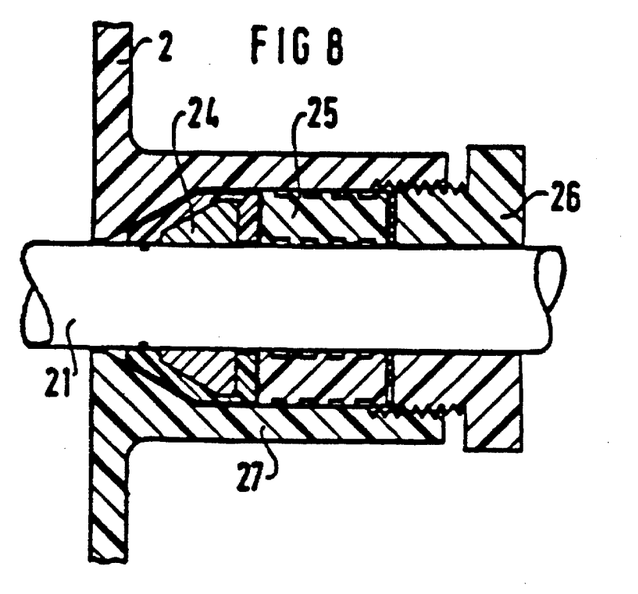
FIG. 8 illustrates a cable introduction with a cable clamp inside the stuffing box.

FIG. 8 illustrates a modification of the seal of FIG. 7; however, a cable interception is additionally undertaken here with the assistance of a cable clamp 24. The cable clamp 24 is conically fashioned and is pressed against the conical wall on the inside of the cable introduction muff 27 by inwardly advancing an annular screw 26. A constriction of the cable clamp 24 occurs given this pressing, the cable clamp 24 thereby more firmly embracing the cable 21 and, thus, clamping it.

Figure 9:
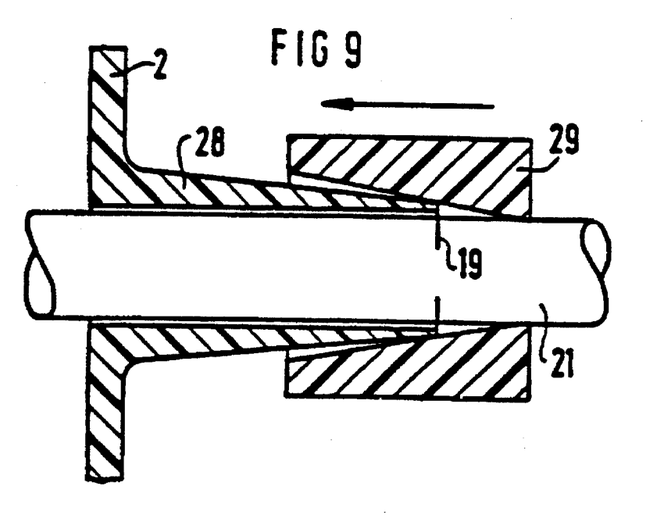
FIG. 9 illustrates a cable introduction having conical clamp elements.

FIG. 9 illustrates an exemplary embodiment having a conically fashioned cable introduction muff 28. A conically matched press sleeve 29 is pulled onto the muff 28 in the direction of the arrow of FIG. 9. A constriction occurs as a result. The seal occurs with an additionally introduced sealant. The elastic lips 19 are again indicated here as centering devices.

Figure 10:
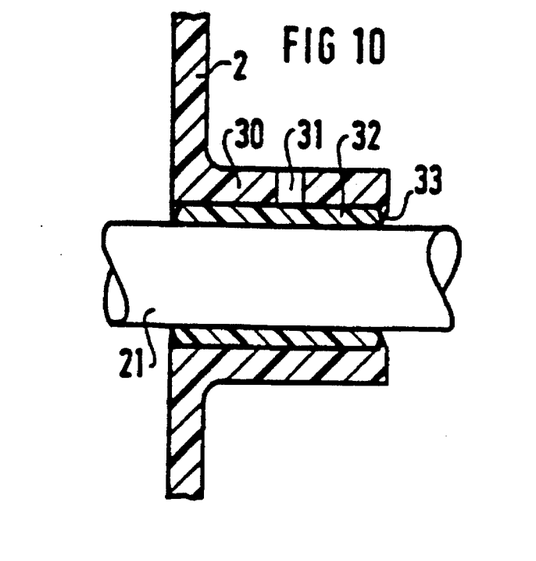
FIG. 10 illustrates a cable introduction having a filled-in sealing compound.

FIG. 10 illustrates a cable introduction muff 30, whereby the interspace between the cable 21 and its inside wall is filled via a filling opening 31 with a filling compound 32, for example with a known two-component casting resin. The elastic lips 33 are arranged at the end of the cable introduction muff 30. The elastic lips 33 form a centering device upon introduction of the cable 21 and then serve as a barrier preventing outflow of the sealant.

Figure 11:
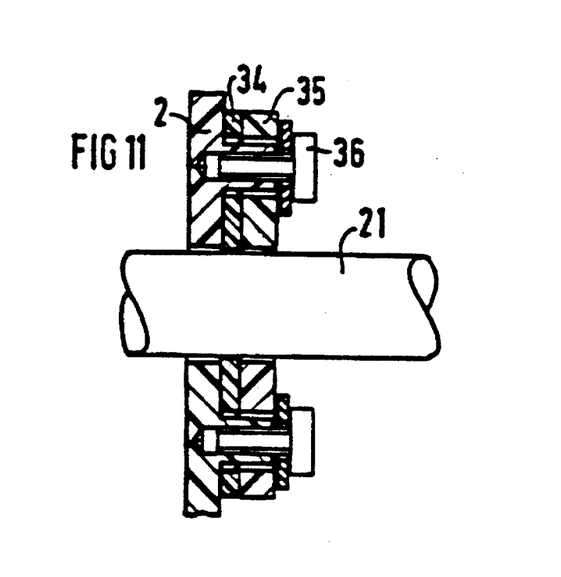
FIG. 11 illustrates a cable introduction having an elastic sealing plate.

FIG. 11 illustrates a sealing possibility with the assistance of a sealing plate 34 that is arranged around the individual cable introduction openings 6 or around all of the cable introduction openings 6 of an end face. This sealing plate 34 is composed of plastic or elastic material and is pressed such with the assistance of a pressure plate 35 put in place thereon that a sealing relative to the introduced cable 21 occurs. The pressing power occurs with screws 36 that act on the pressure plate 35.

Figure 12:
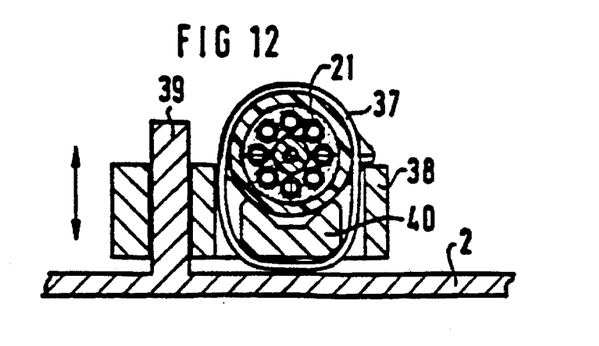
FIG. 12 illustrates a cable interception in the cable introduction opening.

FIG. 12 illustrates a cable interceptor device that can be aligned onto the introduced cable 21 by displacement. In this way, different diameters of the cables can be compensated. The movable clamp part 38 has a channel part 40 into whose channel the cable 21 is placed. The cable 21 is fixed in the channel with the assistance of a clamp strap 37. Since the clamp part 38 is guided height-adjustably at a fixing element 39, it can be aligned to the cable introduction opening or to the diameter of the introduced cable in a simple way during assembly.

Figure 13:
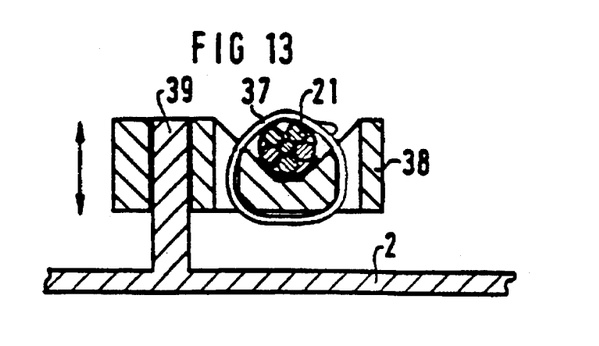
FIG. 13 illustrates another view of a cable interception in the cable introduction opening.

FIG. 13 illustrates the cable interceptor device 38 of FIG. 12 in a higher position since a cable 21 having a small diameter is introduced.

Figure 14:
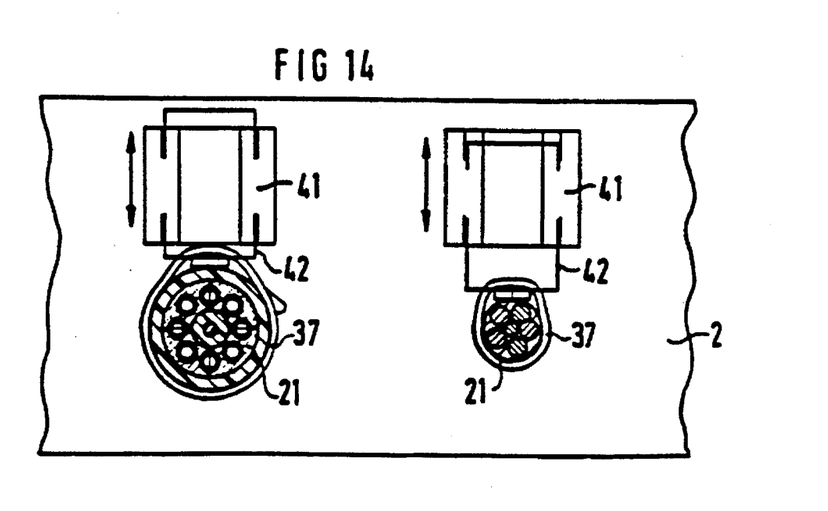
FIG. 14 illustrates another possibility of cable interception.

FIG. 14 illustrates an exemplary embodiment of a cable interceptor having movable, angular clamp parts 42 that are aligned in the fixing parts 41. The fixing of the cable 21 again occurs with the assistance of cable straps. The functioning of the alignment is made clear by the parallel introduction of a cable 21 having a larger diameter and of a cable 21 having a smaller diameter in the same manner of presentation. As a result of the height fixing, the diameter difference can be compensated given the same introduction level.

FIG. 15 again illustrates a centering device that is composed of conically tapering, flexible, segment-like lips, whereby the lips form a conically tapering sub-muff 43 whose sub-segments act resiliently and in centering fashion upon the introduction of a cable 21.

Figure 15:
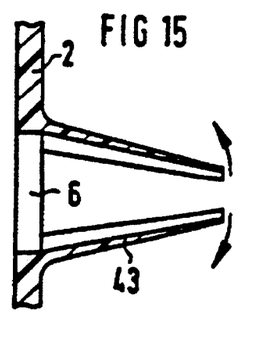
FIG. 15 illustrates a possibility of cable centering in the cable introduction opening, in a cross sectional side view.
Figure 16:
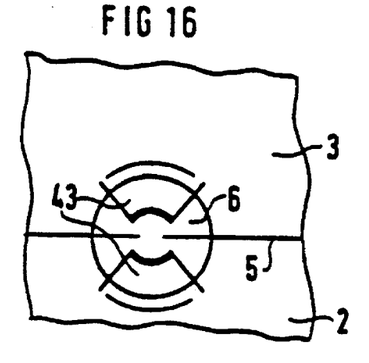
FIG. 16 illustrates the front view of the cable centering of FIG. 15.

FIG. 16 illustrates the exemplary embodiment of FIG. 15 in a front view, whereby the conical taper of the segment-like sub-muff 43 is emphasized as a result. In addition, the cable introduction separating plane 5 is shown between the lower muff shell 2 and the middle part 3.

Figure 17:
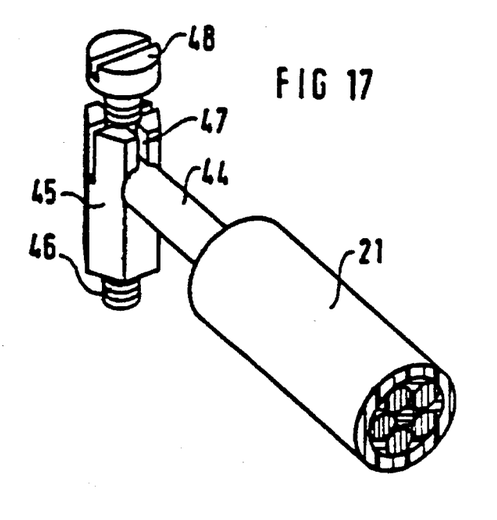
FIG. 17 illustrates an interceptor means for a central element located in the cable.

FIG. 17 illustrates an interceptor element 48 for a central, tensile element 44 that is entrained in the cable 21. The interceptor element 48 is composed of an interceptor element 45 that comprises a slot 47 into which the tensile element 44 is introduced and fixed with a clamp element 48. The interceptor element 45 also has a screw shoulder 46 with which it can be secured to the housing floor of the sleeve shell 2 or to the mounting plate 7.

Figure 18:
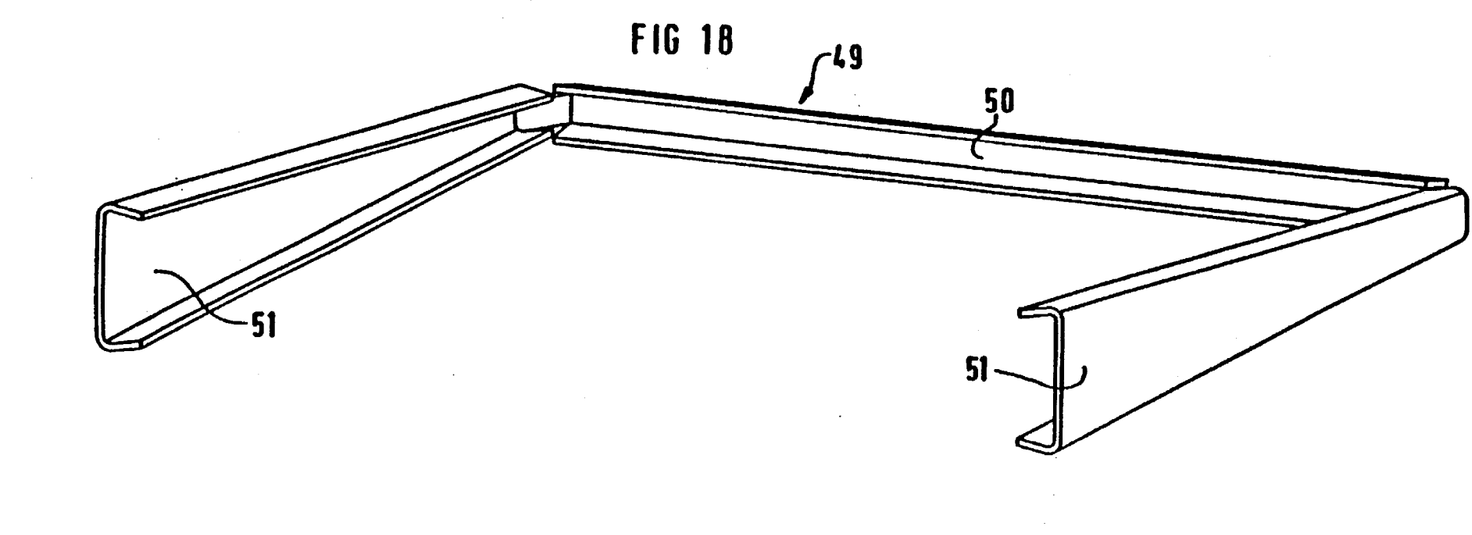
FIG. 18 illustrates a U-shaped closing rail.

FIG. 18 illustrates the fashioning of the U-shaped closing rail 49 that is formed of two legs 51 that spread wedge-shaped toward the ends and of a middle part 50 between the two legs 51. The legs 51 of the closing rail 49, when they are composed of solid material, contain two wedge-shaped channels that are matched to the wedge-shaped closure beads 54 at sleeve shells 1 and 2. The legs 51 are thus narrowest at the ends thereof attached to the middle part 50. In the exemplary embodiment illustrated in FIG. 18, the closing rail 49 is composed of band-shaped material and the channels are produced by appropriate bending. In any case, the channels of the legs 51 and the corresponding closure beads 54 of the muff shells 1 and 2 are undercut (slanted at the sidewalls), so that the closing rail 49 cannot slide off. The middle part 50 of the closing rail 49 that connects the two legs 51, however, cannot be undercut, since it must be slipped onto the closure beads 53 situated at the end face of the cable sleeve. In the final condition, however, the closure beads 53 are firmly held so that the separating plane 4 cannot gape in the end face. In a preferred version, two closing rails 49 are slipped on proceeding, respectively, from each end face. The closure beads 54 increase in thickness in a wedge-shape from the two end faces toward the middle, as shown in FIG. 19.

Figure 19:
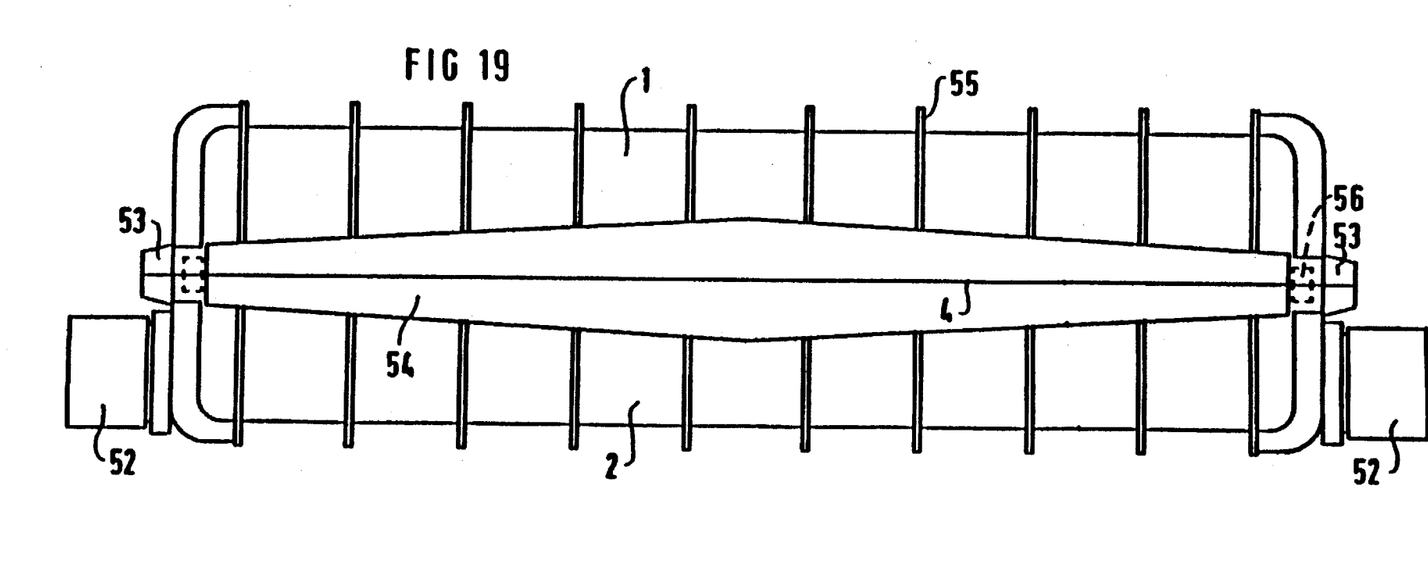
FIG. 19 illustrates a longitudinal view of the cable sleeve in an exemplary embodiment.

FIG. 19 illustrates an exemplary embodiment of a cable sleeve of the invention composed of two sleeve shells 1 and 2 that are provided with outside ribs 55 for stiffening. The closure beads 54 proceeding wedge-shaped in the longitudinal direction are arranged along the sleeve shells 1 and 2. An all-around seal 56 is put in place in the separating plane 4 of the housing, as indicated with broken lines at the end faces. Trapezoidal closure beads 53 may also be seen at the end faces, the middle part 50 of the U-shaped closing rails 49 engaging thereover. The cable introduction muffs 52 are also entered, these lying under the separating plane of the housing with a separate cable introduction plane (not shown).

Figure 20:
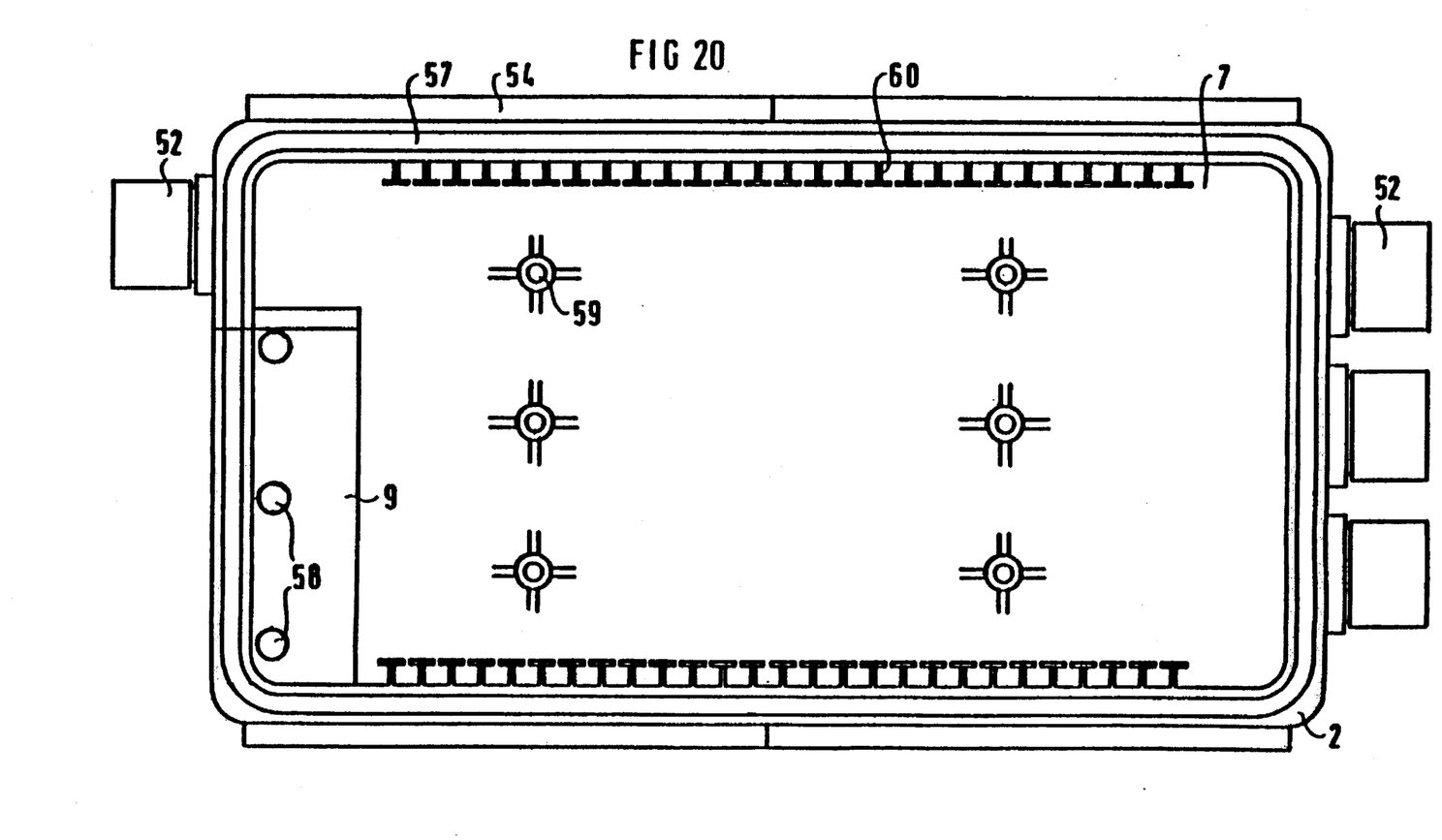
FIG. 20 illustrates a plan view of the sleeve shell of the cable sleeve of FIG. 19.

FIG. 20 illustrates a view into the embodiment of FIG. 19, whereby the mounting plate 7 may be seen. For example, the mounting plate 7 includes lateral incisions 60 into which individual leads can be fixed in clamping fashion. Additional spacer pins 59 enable, for example, a stacked multiple structure of mounting plates. For example, a mixed cable introduction having cable introduction muffs 52 and having a receptacle chamber 9 with fastening locations 58 available for cable intercepts can be provided at one end face.

Figure 21:
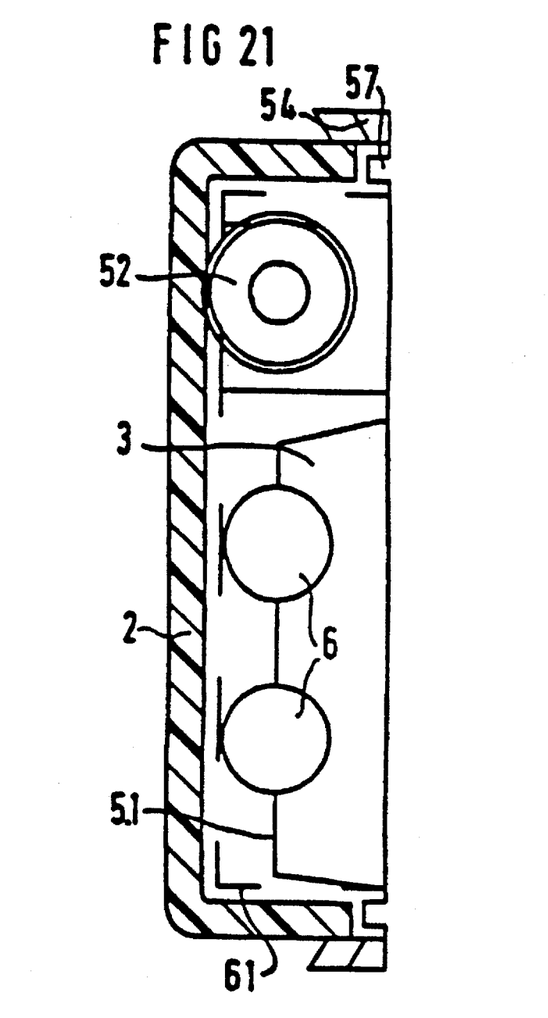
FIG. 21 illustrates an inside view onto the end face of the cable sleeve of FIG. 19.

FIG. 21 further shows that one end face of the lower sleeve shell 2 has an introduction plane 5.1 which is independent of (i.e., does not coincide with) the separating plane only at some locations. A single cable introduction muff 52 is arranged in a region where the separating and introduction planes coincide. Further, the all-around sealing channel 57 in the separating plane 4 of the housing and the attached closure beads 54 may be seen here. The usable sleeve space is also indicated by the indication 61.

It should be understood that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim:

1. A cable sleeve comprising:
    a longitudinally divided housing having opposite end faces and formed by a lower part and an upper part separably mating at a separating plane of the housing, a middle part disposed at least at said end faces separably mating with said lower part at a cable introduction plane independent of said separating plane only at some locations, said middle part and said lower part each having openings therein forming, in combination, introduction openings for cables when said middle part and said lower part are mated at said cable introduction plane;
    an introduction muff arranged in a region where the separating plane of the housing and the cable introduction plane coincide;
    a sealing channel having a circumference in the separating plane;
    a mounting plate affixed inside the housing;
    centerable cable interceptors respectively mounted on the floor of said housing at each introduction opening;
    receptacles for a seal respectively mounted to said housing at each introduction opening;
    each of said upper and lower parts having a bead laterally attached at an exterior thereof adjacent said separating plane, said beads forming, in combination, a closure bead when said lower and upper parts are mated at said separating plane, said closure bead having an exterior tapering shape;
    centering elements arranged at each introduction opening;
    two U-shaped closure rails respectively slidable over said closure bead from each end face, said rails each having legs with an interior channel matched to said exterior shape of said closure bead for holding said lower and upper parts together with said middle part therebetween.

2. The cable sleeve of claim 1, wherein the centerable cable interceptors include a fixing element and an alignment element constructed from movable, angular clamp parts.

3. The cable sleeve of claim 2, wherein the alignment element includes a V-shaped centering channel for receipt of the cable and a centering element, the alignment element shifting and fixing at the fixing element.

4. The cable sleeve of claim 1, wherein the seal is a shrink hose.

5. The cable sleeve of claim 1, wherein the seal is a stuffing box.

6. The cable sleeve of claim 5, wherein the stuffing box includes an annular compression screw, a conical cable clamp, the stuffing box capable of moving conically to an inside end.

7. The cable sleeve of claim 1, wherein the outside of the introduction muff is conically tapered.

8. The cable sleeve of claim 1, further comprising an annular interspace between the inside wall of the introduction muff and introduction openings, the interspace filled with a bitumen basis or a curable resin.

9. The cable sleeve of claim 1, wherein the centering elements are flexible lips having a circumference.

10. The cable sleeve of claim 9, wherein the flexible lips are constructed from segmented, conically tapering sub-muffs.

11. The cable sleeve of claim 1, wherein the centerable cable interceptors provide clamp elements.

12. The cable sleeve of claim 1, wherein the interceptors are located on the mounting plate.

\* \* \* \* \*